US011035973B2

(12) United States Patent
Carefoot

(10) Patent No.: US 11,035,973 B2
(45) Date of Patent: Jun. 15, 2021

(54) PASSIVE UNDERGROUND LOCATOR BEACON

(71) Applicant: Armada Technologies, LLC, Caledonia, MI (US)

(72) Inventor: James L. Carefoot, Gilbert, AZ (US)

(73) Assignee: Armada Technologies, LLC, Caledonia, MI (US)

( * ) Notice: Subject to any disclaimer, the term of this patent is extended or adjusted under 35 U.S.C. 154(b) by 104 days.

(21) Appl. No.: 16/224,118

(22) Filed: Dec. 18, 2018

(65) Prior Publication Data

US 2019/0187318 A1 Jun. 20, 2019

Related U.S. Application Data

(60) Provisional application No. 62/647,159, filed on Mar. 23, 2018, provisional application No. 62/607,986, filed on Dec. 20, 2017.

(51) Int. Cl.
*G01V 3/10* (2006.01)
*G01V 3/08* (2006.01)

(52) U.S. Cl.
CPC ............... *G01V 3/10* (2013.01); *G01V 3/081* (2013.01)

(58) Field of Classification Search
CPC .................................. G01V 3/10; G01V 3/081
See application file for complete search history.

(56) References Cited

U.S. PATENT DOCUMENTS

| | | | | |
|---|---|---|---|---|
| 4,714,888 A * | 12/1987 | French | ................... | G01V 3/081 15/104.063 |
| 4,866,388 A * | 9/1989 | Cosman | .................. | G01V 15/00 324/326 |
| 5,065,098 A * | 11/1991 | Salsman | .................. | G01V 3/15 324/326 |
| 5,264,795 A * | 11/1993 | Rider | ....................... | G01V 3/06 324/326 |
| 7,091,872 B1 * | 8/2006 | Bigelow | ................ | G01V 3/081 323/208 |
| 7,276,910 B2 * | 10/2007 | Prsha | ...................... | G01V 3/088 324/326 |
| 7,568,532 B2 * | 8/2009 | Kuckes | ............... | E21B 47/0228 175/40 |
| 9,938,821 B2 * | 4/2018 | Rodney | ................. | E21B 47/092 |

\* cited by examiner

*Primary Examiner* — Reena Aurora
(74) *Attorney, Agent, or Firm* — Harness, Dickey & Pierce, P.L.C.

(57) ABSTRACT

A radiating beacon system includes a traced wire configured to produce a first magnetic field circulating around the traced wire. The system also includes a radiating beacon configured to produce a second magnetic field circulating around the radiating beacon, wherein the radiating beacon is coupled to the traced wire. The system further includes a locator transmitter configured to apply a tracing signal to the traced wire, wherein the locator transmitter is selectively coupled to the traced wire. The system includes a locator receiver configured to receive the first magnetic field and the second magnetic field, wherein the locator receiver produces an output in response to receiving the first magnetic field and the second magnetic field. Since digital decoders of digital network systems block valves from producing the second magnetic field, an underground irrigation system now includes the radiating beacon system to accurately locate the valves.

19 Claims, 6 Drawing Sheets

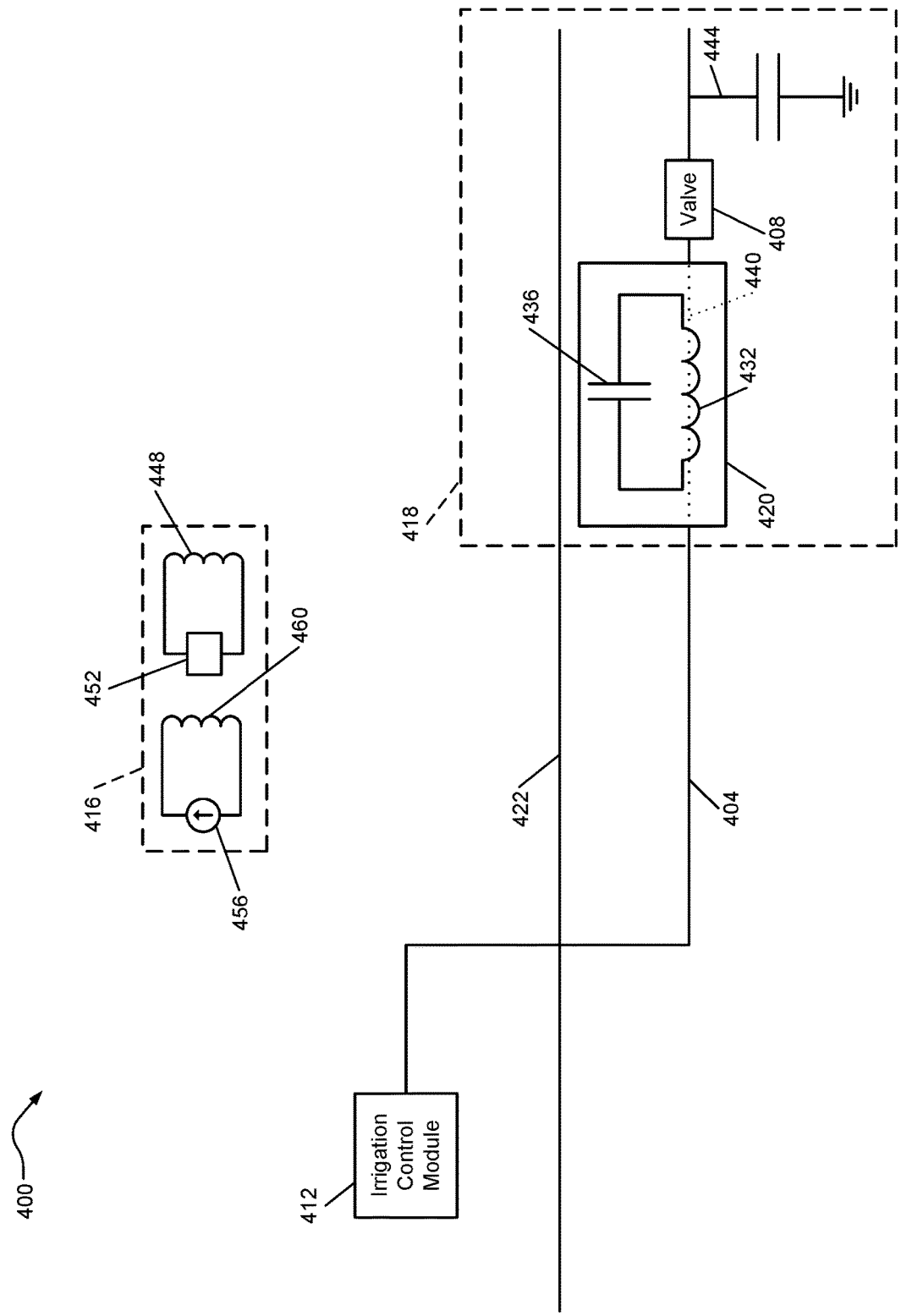

PASSIVE UNDERGROUND LOCATOR BEACON

CROSS-REFERENCE TO RELATED APPLICATIONS

This application claims the benefit of U.S. Provisional Application No. 62/607,986, filed Dec. 20, 2017 and U.S. Provisional Application No. 62/647,159, filed Mar. 23, 2018. The entire disclosures of the applications referenced above are incorporated by reference.

FIELD

The present disclosure relates to devices for locating underground irrigation systems, more specifically systems and methods of locating underground irrigation systems and their components.

BACKGROUND

Well-known automatic underground irrigation systems typically include communication or control cables for operating solenoid-actuated valves ("valves") that control water flow to sprinkler heads. The communication cables may extend from an irrigation control box to the different valves of the underground irrigation system. The valves can be located in subterranean valve boxes, which can be buried, for example, approximately one foot underground. The irrigation control box can independently actuate the valves according to a predetermined schedule. Each valve can correspond to a sprinkler zone and each sprinkler zone can include one or more sprinkler heads. When the irrigation control module of the irrigation control box actuates the valve of a particular sprinkler zone, water can flow to the sprinkler heads and irrigate the surrounding area.

During the operating life of the underground irrigation system, it may be necessary for a user to perform routine maintenance and/or repairs on the valves and/or the lead wires of the system. While the locations of the valves may be known when the underground irrigation system is originally installed, it may nevertheless become difficult to accurately locate the valves and/or lead wires over time because such information is unrecorded, lost or misplaced, and/or due to changes in the terrain, such as landscaping and/or other physical changes to the surrounding area.

Applying current to a traced wire or wires connecting the valves to the irrigation control box is a well-known method of tracing wires in subterranean systems. In response to the applied current, the traced wire and valve generate separate and distinguishable magnetic fields. Using a handheld device including a receiving circuit, a receiving solenoid receives the magnetic fields, which generates current through the receiving circuit. The magnetic fields of the traced wire and the valve are different in strength.

Under certain conditions, the current applied to the traced wire may not reach the valve. For example, the current may not reach the valve when there is a device installed in the system that interferes with the connection between the traced wire and the valve. Therefore, the traced wire will generate a consistent magnetic field until a disruption occurs in the traced wire (assuming the device applying the current to the traced wire is properly grounded). In practice, the traced wire will generate a distinct, smaller magnetic field at the point at an interference of the traced wire occurs.

In some cases, traditional irrigation valve systems have been upgraded to a digital network system. The digital network system includes digital decoders located at each valve. The digital decoders are attached to the traced wire, within or near the valve box, causing an interference with current applied to the traced wire, effectively blocking the valve. Due to the use of digital network systems in irrigation valve systems, when current is applied to the traced wire, the digital decoders block the current and the valve cannot properly generate an identifiable magnetic field. Therefore, a need exists to locate the existing valves in digital irrigation valve systems.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present disclosure solves the problem of locating components of an underground sprinkler systems presented by the inclusion of digital decoders in valve boxes. More specifically, in the system and method of the present disclosure, a radiating beacon is a passive device (i.e., requiring no battery) that can be attached to or around the traced wire (i.e., the wire connecting a valve to an irrigation control box). The radiating beacon is independently attached to or around the traced wire and is capable of generating a magnetic field at the location of the radiating beacon.

The radiating beacon addresses the shortcomings of known devices unable to locate valves that have digital decoders attached to the wire leading to the valve. It is more difficult to locate valves with digital decoders attached to the wire (i.e., a traced wire when locating the valve) because the digital decoder receives an operating signal and power from the wire. Therefore, the valve is effectively blocked from generating a magnetic field in response to current being applied to the wire.

The disclosure provides a radiating beacon system for identifying a location of a valve of an underground irrigation system. The system includes an irrigation control module configured to selectively actuate the valve of the underground irrigation system. The system further includes a traced wire configured to produce a first magnetic field circulating around the traced wire in response to a current running through the traced wire. The system also includes a radiating beacon configured to produce a second magnetic field circulating around the radiating beacon in response to the current running through the traced wire. The radiating beacon is coupled to the traced wire at the location of the valve. The radiating beacon includes an inductor and a capacitor.

The system also includes a locator transmitter configured to apply the current to the traced wire. The locator transmitter is selectively coupled to the traced wire. The traced wire extends from the irrigation control module to the valve of the underground irrigation system. The system further includes a locator receiver configured to receive the first magnetic field and the second magnetic field. The locator receiver includes an output module. In response to the locator receiver receiving at least one of (i) the first magnetic field and (ii) the second magnetic field, the output module produces: a first output in response to the first magnetic field, and a second output in response to the second magnetic field. The second magnetic field is stronger than the first magnetic field.

In one aspect, the present disclosure provides a system including a traced wire configured to produce a first magnetic field circulating around the traced wire, a radiating beacon configured to produce a second magnetic field circulating around the radiating beacon, wherein the radiating beacon is coupled to the traced wire, a locator transmitter configured to apply a tracing signal to the traced wire, wherein the locator transmitter is selectively coupled to the traced wire and a locator receiver configured to receive the first magnetic field and the second magnetic field, wherein the locator receiver produces an output in response to receiving the first magnetic field and the second magnetic field.

In another aspect, the present disclosure provides a radiating beacon system for identifying a location of a valve of an underground irrigation system including an irrigation control module configured to selectively actuate the valve of the underground irrigation system, a traced wire configured to produce a first magnetic field circulating around the traced wire in response to a current running through the traced wire, a radiating beacon configured to produce a second magnetic field circulating around the radiating beacon in response to the current running through the traced wire, where the radiating beacon is coupled to the traced wire at the location of the valve and the radiating beacon includes an inductor and a capacitor, a locator transmitter configured to apply the current to the traced wire, where the locator transmitter is selectively coupled to the traced wire and where the traced wire extends from the irrigation control module to the valve of the underground irrigation system, a locator receiver configured to receive the first magnetic field and the second magnetic field, where the locator receiver includes an output module and in response to the locator receiver receiving at least one of the first magnetic field and the second magnetic field, the output module produces a first output in response to the first magnetic field and a second output in response to the second magnetic field, where the second magnetic field is stronger than the first magnetic field.

In still another aspect, the present disclosure provides a method for locating a valve in a valve box of an underground irrigation system including a digital decoder associated with the valve including attaching a radiating beacon around a traced wire in the valve box, wherein the radiating beacon includes a radiating circuit that includes an inductor and a capacitor, attaching a locator transmitter to the traced wire, wherein the traced wire is selectively attached to an irrigation control module, wherein the irrigation control module selectively actuates the valve, grounding the locator transmitter using a grounding stake, applying a current generated by the locator transmitter to the traced wire, and in response to the current being applied to the traced wire producing a first magnetic field around the traced wire and a second magnetic field around the radiating beacon, detecting magnetic fields within a threshold distance of a locator receiver and in response to detecting the first magnetic field, generating a first output that indicates the detection of the traced wire and in response to detecting the second magnetic field, generating a second output that indicates the detection of the radiating beacon, where the detection of the radiating beacon indicates a valve location.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 4 is a schematic drawing showing another exemplary radiating beacon system placed around a wire for identifying a location of a valve of an underground irrigation system according to the present disclosure.

In the drawings, reference numbers may be reused to identify similar and/or identical elements.

DETAILED DESCRIPTION

Figure 1:
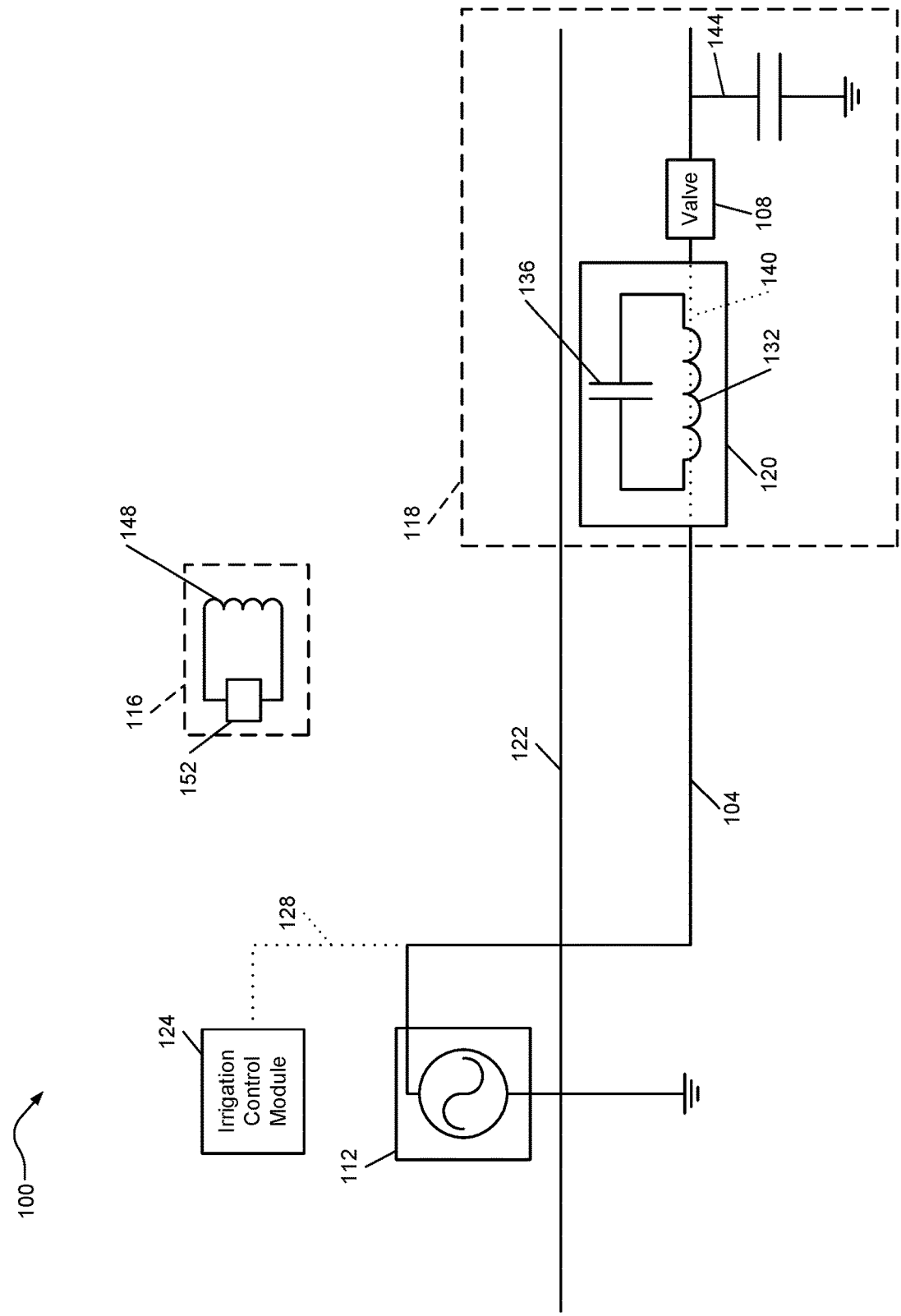
FIG. 1 is a schematic drawing showing an exemplary radiating beacon system placed around a wire for identifying a location of a valve of an underground irrigation system according to the present disclosure.

Some underground irrigation systems include subterranean valve boxes. The precise location of the valve boxes, and the valve, may become unknown over time due, for example, to landscaping or other physical changes to the surrounding grounds. For example, the valve boxes may be covered with gravel, flower beds, etc. However, to facilitate general maintenance or to repair the valve and/or wires connected to the valve with a minimal disruption to the landscape, a user may first need to determine the accurate location of the valve in a manner that is non-disruptive to the terrain.

One type of underground irrigation system comprises a digital network system. An alternative system to traditional underground irrigation systems is a digital network system, which is a newer, updated underground irrigation system. Generally, a digital network system includes an individual cable connected to an irrigation control box, which includes an irrigation control module. Multiple wires connect to the individual cable. The multiple wires extend outward and connect to a plurality of valves in the surrounding area.

Each valve is located inside a valve box and controls a particular zone or station of the underground irrigation system. The digital network system includes at least one digital decoder for each valve. Alternatively, while the individual cable path connects, via the multiple wires, to each valve and corresponding digital decoder, the system may have multiple valves associated with a single decoder connected via the individual cable path. A digital decoder is placed in each valve box and is connected to the respective wire (the wire to be traced or the traced wire) extending from the individual cable to the valve. Each digital decoder receives an operating signal and power from the respective wire. In response to receiving the operating signal, the digital decoder may actuate the respective valve.

Since the digital decoders are connected to the wires already attached to the valves, the digital decoder effectively blocks applied signals (current) when a user is attempting to locate the valve. Therefore, when a digital decoder is included on the respective wire, methods such as applying a current to the respective wire (i.e., traced wire) at the irrigation control box no longer produce a distinguishable magnetic field at the valve because the digital decoder interferes with the current. The present disclosure solves this problem by providing a method of locating the valves in the underground irrigation system even when the underground irrigation system operates as a digital network system including digital decoders.

To facilitate accurately determining the location of an underground valve long after the initial installation of the underground irrigation system, a radiating beacon may be included in the system according to the present disclosure. At the time the underground irrigation system is installed, radiating beacons according to the disclosure can be attached to or around the lead wires that are connected to the valves. The radiating beacons may be attached inside the valve boxes, closely adjacent to the valves. Alternatively, the radiating beacons may be attached outside (but otherwise near to) the valve boxes at the approximate locations of the valves.

The radiating beacon is a passive device that does not require a battery. The radiating beacon includes a circuit with an inductor and a capacitor. The radiating beacon may remain attached to or around the respective wire for the duration of its use.

The valve can be located by detecting the radiating beacon. In one embodiment, a locator transmitter can be attached to the wire at an irrigation control module. The locator transmitter applies current to the wire. In response, the wire creates a magnetic field and the radiating beacon creates a stronger magnetic field. The user may operate a locator receiver, moving the locator receiver around the area of the wire. The locator receiver may detect the magnetic field generated by the wire. In response, the locator receiver may produce a first output indicating the detection of the wire. The first output may be, for example, a signal such as an audio or video signal or the like, or a combination thereof that can provide audible and/or visual or other feedback (e.g., tactile) to the user. The user may then follow the path of the wire according to the first output indicating the detection of the wire.

When the user operating the locator receiver approaches the valve, the locator receiver may detect the magnetic field generated by the radiating beacon and produce a second output indicating the detection of the radiating beacon. The second output may be of the same or different type as the first output. The second output can provide audible and/or visual or other feedback to the user and can be distinguished by the user from the first output. For example, the second output may be a more amplified output (e.g., having a greater magnitude) than the first output. In some embodiments, the first and/or second outputs may be an audio signal produced by the locator receiver that can generate an audible output on a speaker or headphones of the locator receiver. Alternatively, the first and/or second outputs may be a video signal produced by the locator receiver that can generate a visual indicator displayed on a display screen of the locator receiver or other device. Therefore, the locator receiver indicates to the user the location of the wire and the location of the valve. In practice, once the locator receiver produces the second output, the user may prod and excavate the ground in the area to gain access to the valve box and perform any maintenance or repairs.

In FIG. 1, a schematic of an example radiating beacon system 100 placed around a control cable or wire 104 for identifying a location of a valve 108 of an underground irrigation system is shown. The radiating beacon system 100 generally includes a locator transmitter 112, a locator receiver 116, and a radiating beacon assembly 118, containing a radiating beacon 120. To slide the radiating beacon 120 around the wire 104, the user may disconnect the wire 104 at the valve 108 and slide the radiating beacon 120 around the wire 104. The radiating beacon system 100 provides a method for the user of the underground irrigation system to locate the valve 108 of the underground irrigation system. While the underground irrigation system may include a plurality of valves, the valve 108 is shown as a single valve to describe an example implementation of the radiating beacon system 100. A surface 122 indicates which components of the underground irrigation system are below the surface 122 (for example, the radiating beacon 120) and which components are above the surface 122 (for example, the locator transmitter 112).

The underground irrigation system generally includes an irrigation control module 124, the wire 104, and the valve 108. The irrigation control module 124 connects to the valve 108 via the wire 104. The valve 108 may connect to a plurality of sprinkler heads placed throughout a geographic area where the underground irrigation system is located, such as a yard, a golf course, etc. When operating the plurality of sprinkler heads, a first portion 128 of the wire 104 selectively connects the irrigation control module 124 to the valve 108. In this way, the irrigation control module 124 selectively actuates the valve 108 according to a predetermined sprinkler control program stored on the irrigation control module 124. When actuated, the valve 108 supplies water to the plurality of sprinkler heads to irrigate the geographic area.

Alternatively, as shown in FIG. 1, the wire 104 may be connected to the locator transmitter 112. When the wire 104 is connected to the locator transmitter 112, the locator transmitter 112 applies a current to the wire 104. The current is applied at a specific frequency, for example 33 kHz. In response to the current, the wire 104 produces a first magnetic field around the length of the wire 104.

The radiating beacon 120 includes a circuit. The circuit generally includes a transmitter coil 132 (for example, an inductor) and a capacitor 136. The radiating beacon 120 includes the capacitor 136 to make the circuit frequency-sensitive. That is, the radiating beacon 120 may be configured to receive a magnetic field at the specific frequency produced by the locator transmitter 112. The radiating beacon 120 is an individual unit configured to attach around the wire 104. For example, the circuit of the radiating beacon 120 may be placed within a box or cap that is configured to slide around the wire 104. The box may be a plastic clip or any other material that attaches and seals around the wire 104, preventing any moisture from leaking into the box. The box may slide around a second portion 140 of the wire 104 and seal on either end of the box to prevent moisture from reaching the components of the radiating beacon 120.

In some embodiments, the radiating beacon 120 may be within a valve box (not shown) that includes the valve 108 and the radiating beacon 120. Alternatively, the radiating beacon 120 may be placed around the second portion 140 of the wire 104 next to the valve 108. The radiating beacon 120 identifies the location of the valve 108 and, therefore, may be placed around the second portion 140 of the wire 104 close to the valve 108. In alternative embodiments, the radiating beacon 120 may be placed on a portion of the wire 104 on the opposite side of the valve 108, closer to an optional ground wire 144.

The locator receiver 116 includes a receiver coil 148 (for example, an inductor). The receiver coil 148 detects any magnetic fields produced within a threshold distance of the locator receiver 116, including magnetic fields produced by the wire 104 and the radiating beacon 120. That is, any magnetic fields within a certain distance of the locator receiver 116 induce a current through the receiver coil 148.

The transmitter coil 132 of the radiating beacon 120 is configured to generate a second magnetic field. The transmitter coil 132 generates the second magnetic field in response to the locator transmitter 112 applying the current to the wire 104. The second magnetic field is different from and stronger than the first magnetic field. The locator receiver 116 may distinguish between the first and second magnetic fields as the first and second magnetic fields have different magnitudes.

The receiver coil 148 picks up the second magnetic field created by the transmitter coil 132 of the radiating beacon 120. The second magnetic field causes electricity to flow through the circuit of the locator receiver 116, which causes an output module 152 to generate an output. For example, the output may be an audio signal that can produce an audible indicator through a speaker. Alternatively, the output may be a video signal that can produce a visual indicator on a display screen included on the locator receiver 116. In alternative embodiments, the locator receiver 116 can produce haptic feedback to the user indicating the location of the wire 104 and the valve 108. The haptic feedback may be, for example, a vibration.

To locate the valve 108, the user actuates the locator transmitter 112 to send current through the wire 104. As discussed above, the current applied to the wire 104 produces the first magnetic field around the wire 104. Additionally, the transmitter coil 132 generates the second magnetic field in response to the current flowing through the wire 104.

The user operates the locator receiver 116 to locate the first and second magnetic fields. That is, the locator receiver 116 can detect a magnetic field within the threshold distance of the locator receiver 116. Specifically, the receiver coil 148 can detect a magnetic field within the threshold distance and, when any magnetic field is detected, the output module 152 is actuated. The user may traverse a geographic area to determine the location of the wire 104 and the valve based on identifying and/or distinguishing indicators produced from and/or associated with the first output and the second output. As mentioned previously, the first and second outputs indicate, above the surface 122, the locations of the wire 104 and the valve 108. Once located, the user may physically prod and/or excavate the surface 122 to gain access to the valve 108 beneath the surface 122.

Figure 2:
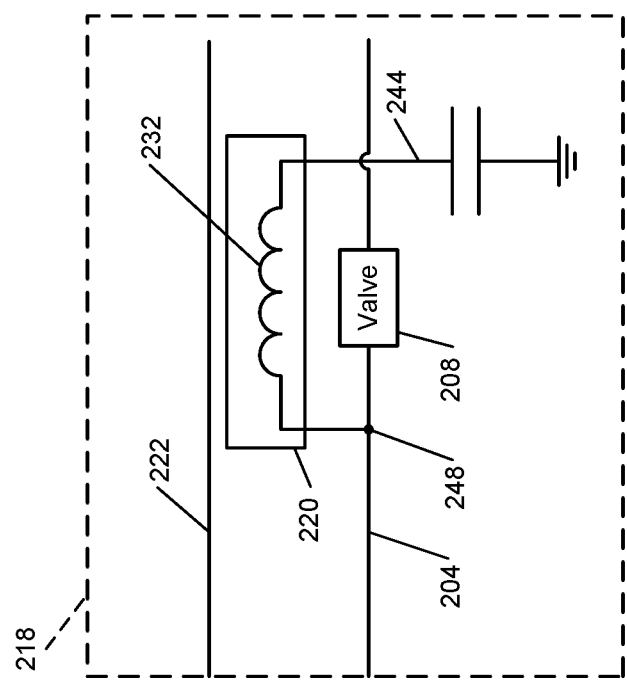
FIG. 2 is a schematic drawing showing an exemplary radiating beacon assembly attached to a wire for identifying a location of a valve of an underground irrigation system according to the present disclosure.

In FIG. 2, a schematic of an example radiating beacon assembly 218 attached to a wire 204 for identifying a location of a valve 208 of an underground irrigation system is shown. The radiating beacon assembly 218 includes a radiating beacon 220 and an optional ground wire 244 below a surface 222. The radiating beacon 220 is electrically connected at a connection point 248 to the wire 204 of the existing underground irrigation system. In an alternative embodiment, the connection point 248 may be within the radiating beacon 220. As discussed previously, the radiating beacon 120 may be in a plastic box or a cap configured to prevent moisture from entering the electrical connections of the radiating beacon 120.

In one embodiment, the radiating beacon assembly 218 of FIG. 2 may be used in place of the radiating beacon assembly 118 of FIG. 1. For example, the locator transmitter 112 may apply the current across the wire 204. In response to the current flowing through the wire 204, the first magnetic field is produced around the wire 204, as was true for the wire 104 of FIG. 1. Further, in response to the current flowing through the wire 204, a transmitter coil 232 of the radiating beacon 220 generates the second magnetic field. The locator receiver 116 may detect the first and second magnetic fields and produce a corresponding output through the output module 152. As mentioned previously, the radiating beacon 220 of FIG. 2 is used similarly to the radiating beacon 120 of FIG. 1. However, the radiating beacon 220 of FIG. 2 is electrically connected to the wire 204 while the radiating beacon 120 of FIG. 1 is attached around the wire 104.

Figure 3A:
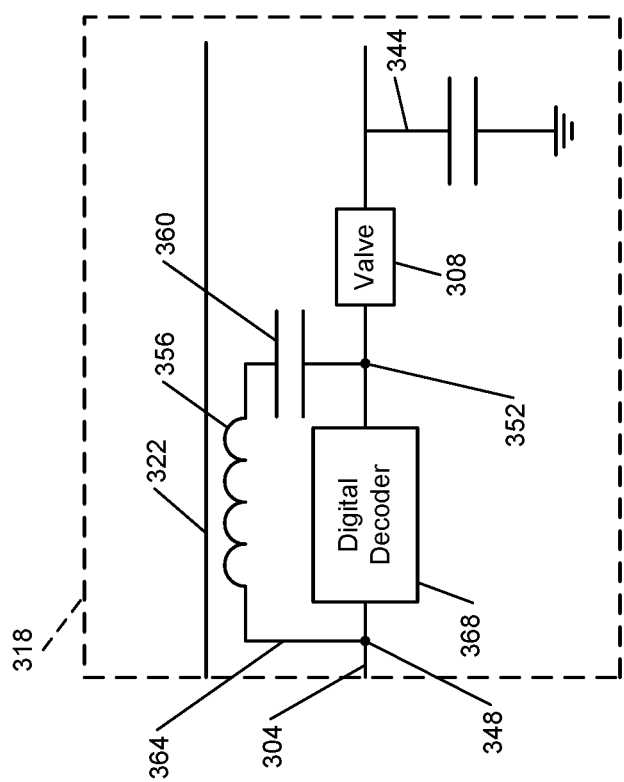
FIG. 3A is a schematic drawing showing an exemplary bypass assembly attached to a wire for identifying a location of a valve of an underground irrigation system according to the present disclosure.

In FIG. 3A, a schematic of an exemplary bypass assembly 318 attached to a wire 304 for identifying a location of a valve 308 of an underground irrigation system is shown. The valve 308 is located under a surface 322 and connected to an optional ground 344. The bypass assembly 318 includes a first connection point 348 and a second connection point 352. The bypass assembly 318 further includes a bypass inductor 356 and a bypass capacitor 360 located along a bypass wire 364. The bypass inductor 356 and the bypass capacitor 360 create a filter circuit along the bypass wire 364. The bypass wire 364 is connected to the wire 304 at the first connection point 348 and the second connection point 352.

The bypass wire 364 is connected to the wire 304 at each end of a digital decoder 368. As discussed previously, the digital decoder 368 is attached to the wire 304, within or near the valve box, causing an interference with current applied to the wire 304, effectively blocking any signal produced by the valve 308. To prevent the digital decoder 368 from blocking signals produced by the valve 308, that is, to allow the valve 308 to act as a radiating beacon, the digital decoder 368 is bypassed according to the filter circuit (the bypass inductor 356 and the bypass capacitor 360) along the bypass wire 364.

The filter circuit may filter at the particular frequency of a locator transmitter. In this way, when the valve 308 of the wire 304 is being actively located, the filter circuit along the bypass wire 364 will bypass the digital decoder 368. Therefore, the valve 308 will act as the radiating beacon as described in FIGS. 1 and 2 to locate the valve 308, similar to the locating methods of traditional underground irrigation systems.

Figure 3B:
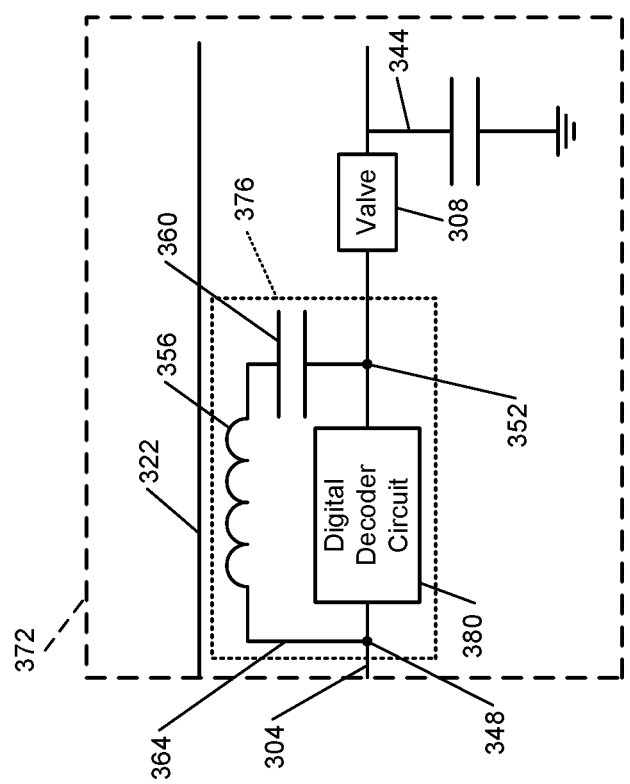
FIG. 3B is a schematic drawing showing an exemplary bypass assembly included in a digital decoder and attached to a wire for identifying a location of a valve of an underground irrigation system according to the present disclosure.

In FIG. 3B, a schematic drawing showing an exemplary bypass assembly 372 included in a digital decoder 376 and attached to the wire 304 for identifying a location of the valve 308 of an underground irrigation system is shown. In various implementations, the bypass inductor 356, the bypass capacitor 360, and the bypass wire 364 can be included in the digital decoder 376. That is, instead of the digital decoder being bypassed, a digital decoder circuit 380 included in the digital decoder 376 would be bypassed. In this way, the digital decoder 376 would include the bypass inductor 356, the bypass capacitor 360, and the bypass wire 364.

In FIG. 4, a schematic of another example radiating beacon system 400 placed around a wire 404 for identifying a location of a valve 408 of an underground irrigation system is shown. The radiating beacon system 400 generally includes an irrigation control module 412, a locator receiver 416, and a radiating beacon 420. The wire 404 extends from the irrigation control module 412 to the valve 408. The radiating beacon 420 is placed around the wire 404 below a surface 422. To place the radiating beacon 420 around the wire 404, the wire 404 may be detached from the valve 408, and the radiating beacon 420 is slid around the wire 404, covering a portion 440 of the wire 404. The radiating beacon 420 is sealed on each side where the wire 404 enters and exits the radiating beacon 420 to prevent moisture from accessing the electrical components of the radiating beacon 420.

Similar to the radiating beacon 120 of FIG. 1, the radiating beacon 420 includes a transmitter coil 432, for example, an inductor, and a capacitor 436. Any magnetic fields within the threshold distance of the wire 404 and the transmitter coil 432 induce electrical activity (that is, a current) in the wire 404 and/or the radiating beacon 420, and, in turn, cause the wire 404 to generate a first magnetic field and the radiating beacon 420 to generate a second magnetic field. As mentioned previously, the radiating beacon 420 may create a larger magnetic field than the wire 404. Therefore, the second magnetic field is larger than the first magnetic field. That is, the radiating beacon system 400 of FIG. 4 is able to generate the magnetic fields using the locator receiver 416.

The locator receiver 416 includes a receiver coil 448, an output module 452, a current source 456, and a locator transmitter coil 460. To locate the valve 408, the current source 456 applies a current across the locator transmitter coil 460. In response to the current, the locator transmitter coil 460 produces a transmitted magnetic field. As the user approaches the wire 404 and/or the radiating beacon 420 with the locator receiver 416, the transmitted magnetic field induces a current in the wire 404 and the transmitter coil 432 of the radiating beacon 420. In response, the wire 404 and the transmitter coil 432 generate magnetic fields. As mentioned above, the wire 404 generates the first magnetic field and the transmitter coil 432 generates the second magnetic field.

In response to the receiver coil 448 detecting the first and the second magnetic fields, a current oscillating at the same frequency as the first or second magnetic field travels to the output module 452. The output module 452 processes the current. The output module 452 produces the first output in response to detecting the first magnetic field and the second output in response to detecting the second magnetic field.

Figure 5:
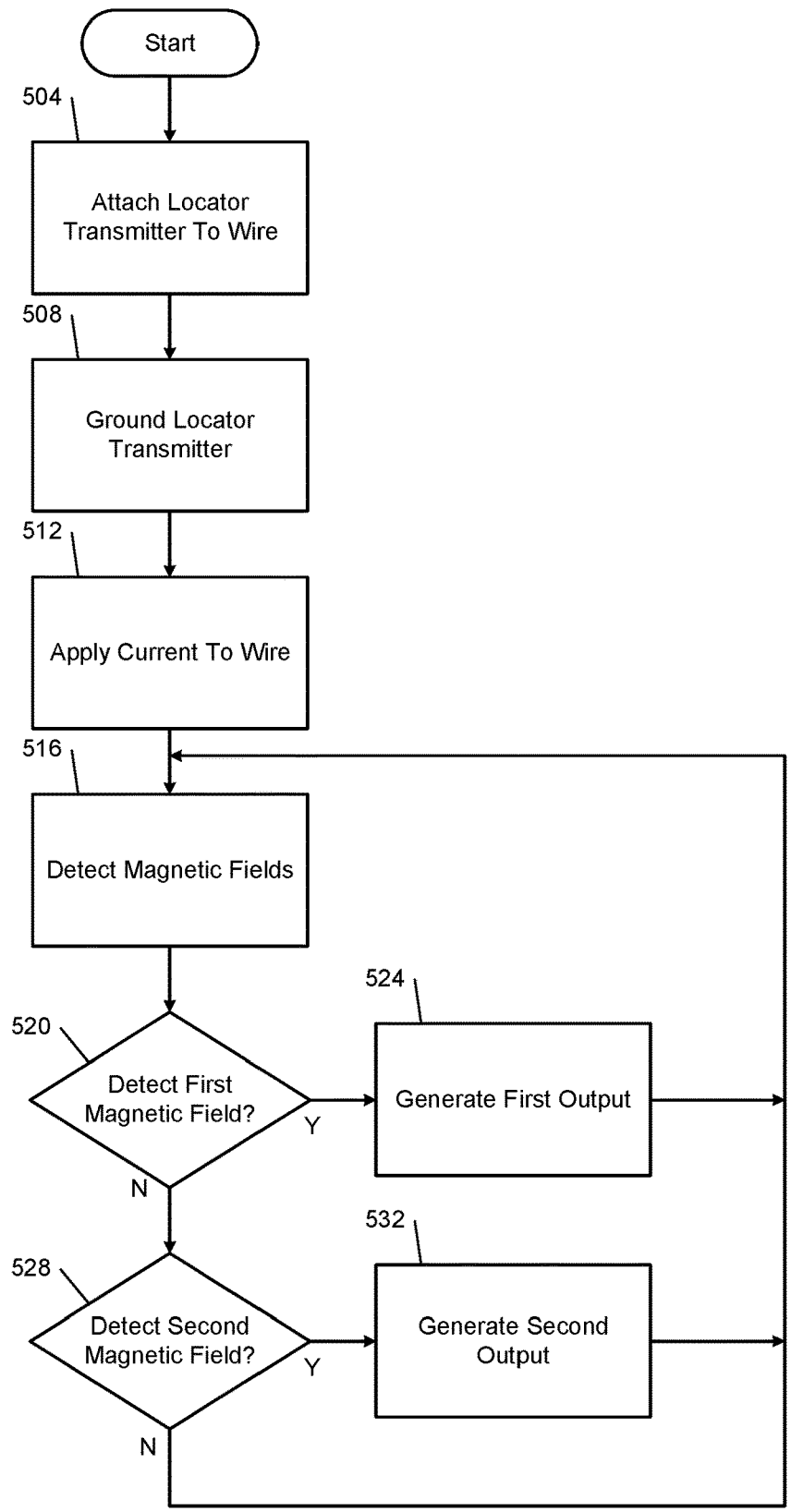
FIG. 5 is a flowchart depicting an exemplary implementation of a radiating beacon system of FIG. 1 according to the present disclosure.

In FIG. 5, a flowchart depicting an example implementation of a radiating beacon system of FIG. 1 is shown. Control begins at 504 where a user attaches the locator transmitter 112 to the wire 104. Control continues to 508 where the user grounds the locator transmitter 112. The locator transmitter 112 may include a grounding stake. The locator transmitter 112 is connected to the grounding stake, and the user places the grounding stake into the ground perpendicular to the wire 104.

At 512, the locator transmitter 112 applies current to the wire 104. In response to the current, the wire 104 generates the first magnetic field around the wire 104. Additionally, the current generates the second magnetic field around the radiating beacon 120. The transmitter coil 132 magnifies the magnetic field created by the wire 104 to create the second magnetic field.

At 516, the locator receiver 116 detects magnetic fields within the threshold distance of the locator receiver 116. The user may walk with and move the locator receiver 116 until the first and/or second outputs are generated by the output module 152. That is, the user will move the locator transmitter in the area of the underground irrigation system to attempt to locate the wire 104 and the valve 108. If magnetic fields are within the threshold distance of the locator receiver 116, the receiver coil 148 detects the respective magnetic field and produces a current oscillating at the same frequency as the respective magnetic field. The current travels to the output module 152.

Control continues to 520 to determine whether the locator receiver 116 has detected the first magnetic field. If 520 is true, control continues to 524 where the output module 152 generates the first output. That is, the locator receiver 116 has identified the wire 104 and, in response to identifying the wire 104, the output module produces an appropriate output to indicate that the wire 104 is in the vicinity of the locator receiver 116, for example, directly below the locator receiver 116.

If 520 is false, control continues to determine whether the locator receiver 116 has detected the second magnetic field at 528. If 528 is true, control continues to 532 to generate the second output. That is, if the locator receiver 116 has detected the second magnetic field, the second output is generated to indicate to the user that the valve 108 is in the vicinity of the locator receiver 116. As described previously, the radiating beacon 120 is placed close to the valve 108 or within the valve box to act as a locating device for the user to quickly and easily locate the location of the valve 108.

Alternatively, if 528 is false, control returns to 516 to detect magnetic fields. Similarly, once the first output is generated at 524 or the second output is generated at 532, control returns to 516 to continue to detect magnetic fields as the user may continue to move the locator receiver 116 to detect magnetic fields in the area.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

What is claimed is:

1. A system comprising:
a traced wire configured to produce a first magnetic field circulating around the traced wire;
a radiating beacon configured to produce a second magnetic field circulating around the radiating beacon, wherein the radiating beacon is coupled to the traced wire;
a locator transmitter configured to apply a tracing signal to the traced wire, wherein the locator transmitter is selectively coupled to the traced wire;
a locator receiver configured to receive the first magnetic field and the second magnetic field, wherein the locator receiver produces an output in response to receiving the first magnetic field and the second magnetic field;
a valve;
an irrigation control module selectively coupled to the traced wire and configured to selectively actuate the valve; and
wherein, in response to the locator transmitter being coupled to the traced wire, the irrigation control module is decoupled from the traced wire and the valve is coupled to the traced wire.

2. The system of claim 1 wherein the tracing signal applied to the traced wire is a current applied to the traced wire in response to the locator transmitter being coupled to the traced wire.

3. The system of claim 1 wherein the radiating beacon includes a radiating circuit including an inductor and a capacitor.

4. The system of claim 3 wherein the radiating circuit is attached to the traced wire within a predetermined distance of the valve, wherein the valve is coupled to the traced wire.

5. The system of claim 3 wherein the radiating circuit is included in a water-resistant box configured to be placed around the traced wire, and wherein the inductor of the radiating circuit is activated by a current applied to the traced wire.

6. The system of claim 3 wherein the radiating circuit includes a first attachment wire and a second attachment wire, and wherein the first attachment wire is configured to attach to the traced wire on a first side of a digital decoder and the second attachment wire is configured to attach to the traced wire on a second side of the digital decoder.

7. The system of claim 6 wherein the digital decoder is a digital decoder circuit.

8. The system of claim 1 wherein the locator receiver:
receives the first magnetic field in response to the locator receiver being within a first threshold distance of the traced wire; and
receives the second magnetic field in response to the locator receiver being within a second threshold distance of the radiating beacon.

9. The system of claim 1 wherein the locator receiver includes an output module configured to produce the output, wherein, in response to the locator receiver receiving at least one of (i) the first magnetic field and (ii) the second magnetic field, the output module produces:
a first output in response to the first magnetic field; and
a second output in response to the second magnetic field.

10. The system of claim 9 wherein the first output and the second output are audible, and wherein a first volume of the first output is less than a second volume of the second output.

11. The system of claim 1 wherein the radiating beacon includes an inductor, wherein a first end of the inductor is coupled to the traced wire and a second end of the inductor is coupled to a capacitor, and wherein the capacitor is grounded.

12. A radiating beacon system for identifying a location of a valve of an underground irrigation system comprising:
an irrigation control module configured to selectively actuate the valve of the underground irrigation system;

a traced wire configured to produce a first magnetic field circulating around the traced wire in response to a current running through the traced wire;

a radiating beacon configured to produce a second magnetic field circulating around the radiating beacon in response to the current running through the traced wire, wherein the radiating beacon is coupled to the traced wire at the location of the valve, and wherein the radiating beacon includes an inductor and a capacitor;

a locator transmitter configured to apply the current to the traced wire, wherein the locator transmitter is selectively coupled to the traced wire, and wherein the traced wire extends from the irrigation control module to the valve of the underground irrigation system;

a locator receiver configured to receive the first magnetic field and the second magnetic field, wherein the locator receiver includes an output module; and in response to the locator receiver receiving at least one of (i) the first magnetic field and (ii) the second magnetic field, the output module produces:
  a first output in response to the first magnetic field; and
  a second output in response to the second magnetic field,
  wherein the second magnetic field is stronger than the first magnetic field.

13. The radiating beacon system of claim 12 wherein the radiating beacon is coupled around a digital decoder to bypass the digital decoder.

14. The radiating beacon system of claim 13 wherein a first end of the radiating beacon is coupled to the traced wire on a first side of the digital decoder and a second end of the radiating beacon is coupled to the traced wire on a second side of the digital decoder.

15. The radiating beacon system of claim 12 further comprising a weather-resistant box configured to attach around the traced wire, and wherein the weather-resistant box includes the radiating beacon.

16. The radiating beacon system of claim 12 wherein the locator receiver:
  receives the first magnetic field in response to the locator receiver being within a first threshold distance of the traced wire; and
  receives the second magnetic field in response to the locator receiver being within a second threshold distance of the radiating beacon.

17. The radiating beacon of claim 12 wherein the first output and the second output are one of (i) an audible sound, (ii) a visible indicator, and (iii) haptic feedback.

18. A method for locating a valve in a valve box of an underground irrigation system including a digital decoder associated with the valve comprising the steps of:
  attaching a radiating beacon around a traced wire in the valve box, wherein the radiating beacon includes a radiating circuit that includes an inductor and a capacitor;
  attaching a locator transmitter to the traced wire, wherein the traced wire is selectively attached to an irrigation control module, wherein the irrigation control module selectively actuates the valve;
  grounding the locator transmitter using a grounding stake;
  applying a current generated by the locator transmitter to the traced wire;
  in response to the current being applied to the traced wire:
    producing a first magnetic field around the traced wire; and
    producing a second magnetic field around the radiating beacon;
  detecting magnetic fields within a threshold distance of a locator receiver;
  in response to detecting the first magnetic field, generating a first output, wherein the first output indicates the detection of the traced wire; and
  in response to detecting the second magnetic field, generating a second output, wherein the second output indicates the detection of the radiating beacon, wherein the detection of the radiating beacon indicates a valve location.

19. The radiating beacon of claim 12 wherein the first output and the second output are audible, and wherein a first volume of the first output is less than a second volume of the second output.

* * * * *